United States Patent
Upadhyaya

(10) Patent No.: US 10,168,883 B2
(45) Date of Patent: Jan. 1, 2019

(54) CONFIGURING USER PROFILES ASSOCIATED WITH MULTIPLE HIERARCHICAL LEVELS

(71) Applicant: Oracle International Corporation, Redwood Shores, CA (US)

(72) Inventor: Anadi Upadhyaya, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 433 days.

(21) Appl. No.: 14/801,352

(22) Filed: Jul. 16, 2015

(65) Prior Publication Data
US 2017/0017383 A1 Jan. 19, 2017

(51) Int. Cl.
| | | |
|---|---|---|
| H04L 12/24 | (2006.01) | |
| G06Q 10/06 | (2012.01) | |
| G06Q 30/02 | (2012.01) | |
| G06F 3/0484 | (2013.01) | |
| H04L 29/08 | (2006.01) | |
| G06Q 10/00 | (2012.01) | |

(52) U.S. Cl.
CPC ...... *G06F 3/04847* (2013.01); *G06F 3/04842* (2013.01); *G06Q 10/00* (2013.01); *H04L 67/306* (2013.01); *H04L 41/22* (2013.01)

(58) Field of Classification Search
None
See application file for complete search history.

(56) References Cited

U.S. PATENT DOCUMENTS

| | | | |
|---|---|---|---|
| 5,729,734 A * | 3/1998 | Parker | G06F 9/468 |
| 6,202,066 B1 * | 3/2001 | Barkley | G06F 21/6218 |
| | | | 707/785 |
| 8,635,080 B2 | 1/2014 | Mckeown, III et al. | |
| 2003/0074606 A1 * | 4/2003 | Boker | G06F 11/3495 |
| | | | 714/42 |
| 2006/0229890 A1 | 10/2006 | Sattler et al. | |
| 2010/0064737 A1 | 3/2010 | Upadhyaya et al. | |
| 2010/0162364 A1 * | 6/2010 | Roth | G06F 21/604 |
| | | | 726/4 |
| 2010/0306268 A1 * | 12/2010 | Bhatti | G06F 21/604 |
| | | | 707/783 |

(Continued)

OTHER PUBLICATIONS

IBM, "IBM Kenexa Talent Manager on Cloud", Available at <http://www-03.ibm.com/software/products/en/ibm-kenexa-talent-manager-on-cloud>, Retrieved on Feb. 19, 2015, 2 pages.

(Continued)

*Primary Examiner* — Jeffrey A Gaffin
*Assistant Examiner* — Nhat Huy T Nguyen
(74) *Attorney, Agent, or Firm* — Invoke

(57) ABSTRACT

A method for configuring user profiles associated with multiple hierarchical levels, including identifying multiple hierarchical levels in an organization to be configured, concurrently displaying multiple interface components corresponding respectively to the hierarchical levels, each interface component configured to receive user input for the respective hierarchical level, configuring data of a first user profile associated with a first hierarchical level based on a first value specified by user input, and configuring data of a second user profile associated with a second hierarchical level based on a second value specified by user input.

20 Claims, 8 Drawing Sheets

(56) References Cited

U.S. PATENT DOCUMENTS

2012/0053952 A1  8/2012  Upadhyaya et al.
2012/0330709 A1* 12/2012  Khorsheed ..... G06Q 10/063114
                                                         705/7.15

OTHER PUBLICATIONS

Manish's Blog, "SAP Enterprise Compensation Management", Jul. 31, 2012, 180 pages.
Peoplefluent, "Compensation Management Software", Copyright 2015, 3 pages.

* cited by examiner

CONFIGURING USER PROFILES ASSOCIATED WITH MULTIPLE HIERARCHICAL LEVELS

TECHNICAL FIELD

The present disclosure relates to workplace application configuring user profiles. In particular, the present disclosure relates to configuring user profiles associated with multiple hierarchical levels.

BACKGROUND

Many enterprises utilize workplace applications to manage the workforce. Enterprise as used herein may refer to any organization of persons, such as a business, university, government, military, nonprofit organization, or social club. The terms "enterprise" and "organization" may be used interchangeably herein. Many enterprises are structured using one or more organizational hierarchies. An organizational hierarchy is an arrangement or classification of employees or members of an organization according to superiority.

Functionalities of a workplace application may include compensation administration, benefits administration, personnel tracking, payroll, employee scheduling, performance review, human resources management, and other enterprise management features. Each employee of an enterprise may correspond to a user profile used in the workplace application. Management personnel may use the workplace application to configure data of user profiles on an individual basis or a company-wide basis. Employees of the enterprise may use the workplace application to view data that has been configured for user profiles, or to modify or update data for user profiles.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW

Employees or members of many enterprises are structured in an organizational hierarchy. As described above, an organizational hierarchy is an arrangement or classification of employees or members of an organization according to superiority. In an example, a Chief Executive Officer (CEO) may be positioned at the topmost level of an organizational hierarchy, while a junior employee may be positioned at the lowest level of the organizational hierarchy.

In one or more embodiments, an application manages user profiles corresponding to employees or members of an enterprise. Each user profile is associated with a hierarchical level. A user interface is configured to receive user input for configuring user profiles associated with multiple hierarchical levels concurrently. Data of user profiles corresponding to a same hierarchical level are concurrently configured to a same value. Meanwhile, data of user profiles corresponding to different hierarchical levels are concurrently configured to same or different values.

In one or more embodiments, the user profiles that may be configured by a current user are restricted based on the hierarchical levels of the user profiles. In an embodiment, the user profiles that may be configured are limited to the user profiles that are associated with hierarchical levels below a particular hierarchical level of the current user. In another embodiment, the user profiles that may be configured are limited to the user profiles that are both (a) associated with hierarchical levels below a particular hierarchical level of the current user, and (b) subordinate to the current user.

In one or more embodiments, values for configuring user profiles associated with a particular hierarchical level are valid only if the values are within an acceptable range. The acceptable range is determined based on (a) a value already configured for a user profile of the current user and/or (b) values already configured for user profiles that are associated with hierarchical levels above the particular hierarchical level of the user profiles being configured.

2. ARCHITECTURAL OVERVIEW

Figure 1:
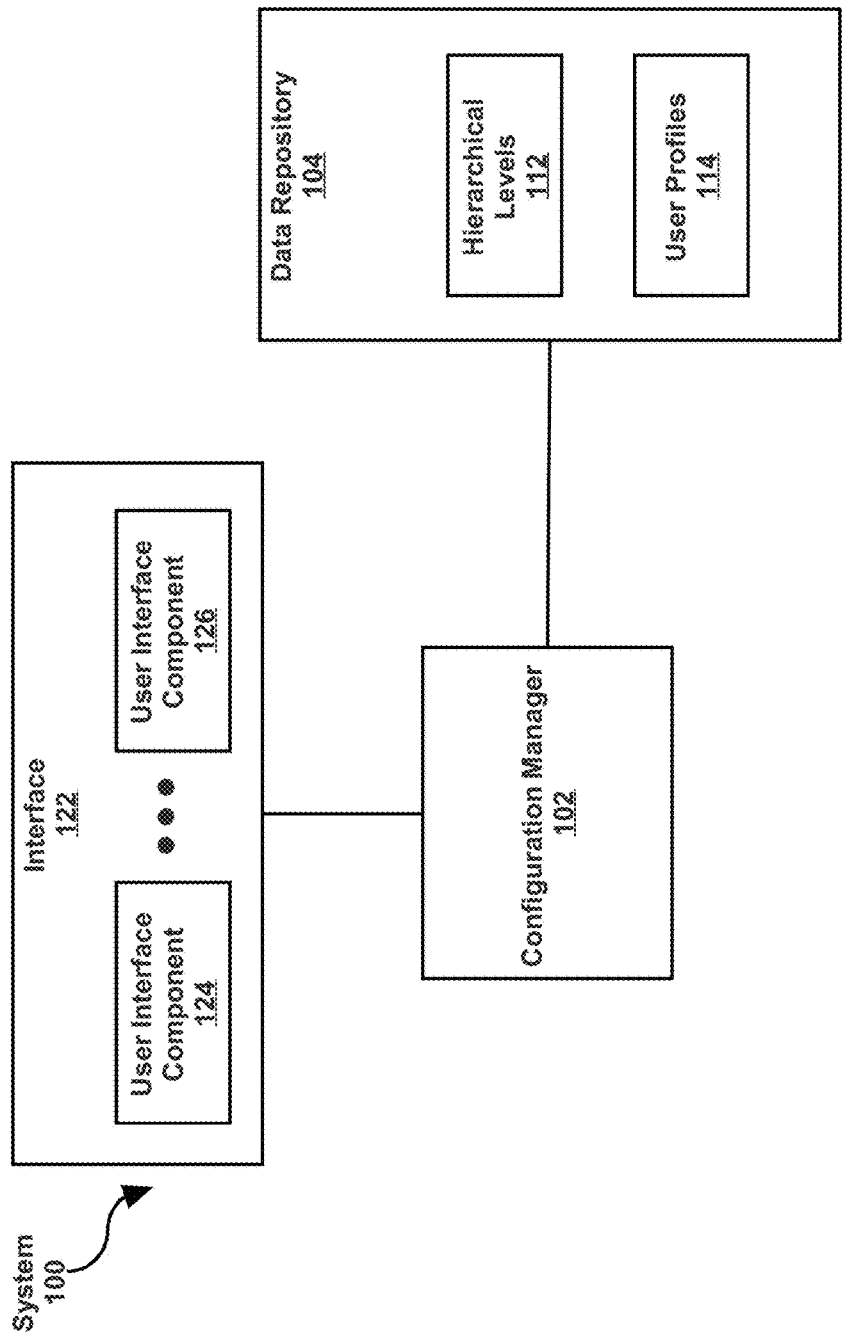
FIG. 1 illustrates a system in accordance with one or more embodiments.

FIG. 1 illustrates a system 100 in accordance with one or more embodiments. As illustrated in FIG. 1, system 100 includes a configuration manager 102, a data repository 104, and an interface 122. In one or more embodiments, system 100 may include more or fewer components than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In one or more embodiments, data repository 104 is any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be or may execute on the same computing system as configuration manager 102. Alternatively or additionally, data repository 104 may be on a separate computing system than configuration manager 102. Data repository 104 may be connected to configuration manager 102 via a direct connection or via a network. Hierarchical levels 112 and user profiles 114 may be implemented across any of components within system 100, however, are illustrated within data repository 104 for purposes of clarity and explanation.

In an embodiment, hierarchical levels 112 are levels or ranks within an organizational hierarchy. As described above, an organizational hierarchy is an arrangement or classification of employees or members of an organization according to superiority. Different types of organizational hierarchies classify employees based on different criteria for determining superiority. Different types of organizational hierarchies may co-exist in one organization.

One example of an organizational hierarchy is a project hierarchy. A project hierarchy classifies employees by the relative superiority of employees with respect to one or more projects. In an example, a first employee may report to a second employee on a particular project. The first employee would then be below the second employee in a project hierarchy.

Another example of an organizational hierarchy is a positional hierarchy. A positional hierarchy classifies employees by the relative superiority of positions of the employees. In an example, a first employee's position may be Associate and a second employee's position may be Manager. The Associate position may report to the Manager position. The first employee would then be below the second employee in a positional hierarchy.

Another example of an organizational hierarchy is a departmental hierarchy. A departmental hierarchy classifies employees by the relative superiority of departments to which employees belong. In an example, a first employee may be a head of a sales team for France, and a second employee may be a head of a sales team for Europe. The sales team for France may report to the sales team for Europe. The first employee would then be below the second employee in a departmental hierarchy.

As used herein, a first employee is referred to as a "direct manager" to a second employee, if the first employee is immediately superior to the second employee. Conversely, the second employee is referred to as a "direct report" to the first employee.

As used herein, a first employee is referred to as an "indirect manager" to a second employee, if the first employee is superior to one or more employees who are superior to the second employee. Conversely, the second employee is referred to as an "indirect report" to the first employee.

As used herein, a first hierarchical level corresponding to a first employee is referred to as being "above" a second hierarchical level corresponding to a second employee, if the first employee is a direct or indirect manager to the second employee. Conversely, the second hierarchical level is referred to as being "below" the first hierarchical level.

As used herein, a first employee is referred to herein as a "sibling" to a second employee, if both the first employee and the second employee belong to a same hierarchical level under a same direct manager. In an example, a first associate and a second associate are direct reports to a same vice president (VP). The first associate and the second associate are siblings. In another example, a first associate is a direct report to a first VP, and a second associate is a direct report to a second VP. The first associate and the second associate are on the same hierarchical level but are not siblings.

In an example, a CEO may be immediately superior to a first VP and a second VP. The first VP may be immediately superior to a first associate, and the second VP may be immediately superior to a second associate. The CEO would then be a direct manager to the two VPs and an indirect manager to the two associates. The first associate would be a direct report to the first VP and an indirect report to the CEO. The second associate would be a direct report to the second VP and an indirect report to the CEO. The two VPs would also be siblings to each other. Further, a first hierarchical level corresponding to the CEO would be above a second hierarchical level corresponding to the two VPs. The first hierarchical level would also be above a third hierarchical level corresponding to the two managers. The third hierarchical level would be below the first hierarchical level and the second hierarchical level.

In one or more embodiments, hierarchical levels 112 are numbered according to how high or low hierarchical levels 112 are positioned within the organizational hierarchy. Continuing the example above, the first hierarchical level corresponding to the CEO may be the highest level of the organizational hierarchy and would be numbered "Level 1," or alternatively named "Top Level." The second hierarchical level corresponding to the two VPs would be numbered "Level 2." The third hierarchical level corresponding to the two managers would be numbered "Level 3."

In one or more embodiments, all or a portion of employees on a lower hierarchical level may be subordinate to a particular employee on a higher hierarchical level. Conversely, all or a portion of employees on a higher hierarchical level may be superior to a particular employee on a lower hierarchical level. Continuing the example above, all employees on Level 2 (the two VPs) would be subordinate to a particular employee on Level 1 (the CEO). However, only a portion of employees on Level 3 (the first manager, but not the second manager) would be subordinate to a particular employee on Level 2 (the first VP).

In one or more embodiments, hierarchical levels 112 may or may not be fully populated. A particular hierarchical level is not fully populated if an employee corresponding to a hierarchical level above the particular hierarchical level is immediately superior to an employee corresponding to a hierarchical level below the particular hierarchical level.

In an example of a positional hierarchy, Level 1 may represent the position of VPs, Level 2 may represent the position of senior managers, and Level 3 may represent the position of junior managers. A first team, responsible for a heavier workload, may have a vice president, senior managers, and junior managers. A second team, responsible for a lighter workload, may have a vice president and junior managers, but no senior managers. Level 2 would then be populated for the first team but be skipped for the second team. Level 2 may be referred to as being not fully populated.

In one or more embodiments, hierarchical levels 112 are stored as levels of a tree structure. Employees in a particular hierarchical level are represented by nodes in a particular level of the tree structure. Each node may have a branch extending towards another node. A branch between two nodes represents a relative superiority of the employees represented by the two nodes. A branch extending downwards from a first node to a second node indicates that a first employee corresponding to the first node is a direct manager of a second employee corresponding to the second node. Conversely, a branch extending upwards from a first node to a second node indicates that a first employee corresponding to the first node is a direct report of a second employee corresponding to the second node.

In one or more embodiments, each of user profiles 114 corresponds to an employee or member of an enterprise. Each of user profiles 114 stores data related to the corresponding employee or member. User profiles 114 may be stored in any data object, format, or structure, such as a table, a linked list, a vector, an array, a database, and/or nodes of a tree structure.

In an embodiment, a user profile includes personal information of an employee, such as a name, address, and citizenship. A user profile also includes information on an employee's relationship to an organization, such as a position of the employee, a salary, and working hours.

In an embodiment, a user profile is associated with a hierarchical level. A user profile may include the names of subordinates and superiors of an employee. A user profile may also include a hierarchical level corresponding to an employee. The hierarchical level corresponding to the employee may be identified by the number of the hierarchical level, such as, "Level 3." A user profile may also be associated with a level of a tree structure that reflects the organizational hierarchy.

In an embodiment, a user profile includes information related to one or more projects or tasks assigned to an employee. Project information may include a description of the project, one or more team members for the project, one or more supervisors for the project, and one or more deadlines for the project.

In an example, a user profile includes information related to a compensation allocation plan. The compensation allocation plan is a project that sets the future compensation of one or more employees in an organization. A particular employee may be responsible for completing a portion of the compensation allocation plan that relates to the subordinates of the particular employee. The particular employee may be required to complete this portion of the compensation allocation plan by a particular deadline. The particular deadline is stored in a user profile of the particular employee.

In an example, a compensation allocation plan may involve setting compensations for a very large number of employees, up to hundreds of thousands or more. The compensation allocation plan may be completed by different hierarchical levels in phases. The lowest hierarchical level may complete its portion of the compensation allocation plan first. The next hierarchical level completes its portion of the compensation allocation plan by reviewing the work of the lowest hierarchical level. The highest hierarchical level reviews all work performed by lower hierarchical levels. The deadline set for the lowest hierarchical level may be the earliest. The deadline set for the highest hierarchical level may be the latest. Different deadlines for the compensation allocation plan may be stored in different user profiles.

In an embodiment, user profiles 114 are associated with a user account that is accessed or logged onto using a username and password. Further, user profiles 114 are associated with roles that may be assumed by users in the use of configuration manager 102. A particular role of a user profile may define or limit features of configuration manager 102 that are accessible to the user profile.

An example role is a system administrator, which has overall management authority over configuration manager 102 as well as other user profiles. All features of configuration manager 102 may be accessible to a system administrator. Another example role is a default user, which has management authority over direct and indirect reports. Features of configuration manager 102 that configure user profiles of direct and indirect reports are accessible to a default user.

In one or more embodiments, configuration manager 102 refers to hardware and/or software configured to perform operations described herein for configuring data of user profiles 114 associated with multiple hierarchical levels 112. Operations for identifying multiple hierarchical levels to be configured is described below with reference to FIG. 2. Operations for displaying multiple user interface components configured to receive user input specifying data for multiple hierarchical levels is described below with reference to FIG. 3.

In an embodiment, configuration manager 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a printer, a mobile handset, a smartphone, and a personal digital assistant ("PDA").

In one or more embodiments, interface 122 includes any type of input/output (I/O) interface including, but not limited to, a screen, a monitor, a touchscreen, a keyboard, a mouse, a speaker, and/or a microphone. Interface 122 may be implemented by one or more devices. Data received through interface 122 may be stored at data repository 104. Interface 122 is configured to display any number of user interface components 124-126.

In one or more embodiments, user interface components 124-126 include functionality for presenting any type of visual, audio, tactile, or other sensory of information generated by configuration manager 102. User interface components 124-126 may be, for example, Graphical User Interface (GUI) elements. Further, user interface components 124-126 include functionality for accepting user input. User interface components 124-126 may be, for example, text fields, radio buttons, dropdown menus, date selectors, and/or checkboxes.

In one or more embodiments, all or a subset of user interface components 124-126 may be displayed concurrently with each other. Further, user interface components 124-126 may interact with each other. For example, one user interface component 124 may include a button or other interactive field that triggers the presentation of another user interface component 126.

In one or more embodiments, user interface component 124 is configured to receive user input for a first hierarchical level and user interface component 126 is configured to receive user input for a second hierarchical level.

In one or more embodiments, user interface components 124-126 are configured to receive user input specifying a user profile of a current user. A current user is a user whose user profile is being used to input user input via interface 122. User interface component 124 accepts a username and user interface component 126 accepts a password, for accessing or logging into one of user profiles 114.

3. CONCURRENTLY CONFIGURING DATA OF USER PROFILES ASSOCIATED WITH MULTIPLE HIERARCHICAL LEVELS

In an embodiment, data of user profiles associated with multiple hierarchical levels is concurrently configured. Prior to the configuration, the hierarchical levels to be configured are identified based on a particular hierarchical level of a user profile of a current user. Identification of hierarchical levels to be configured is described below with reference to FIG. 2. Further, multiple user interface components are concurrently displayed to receive user input specifying data for multiple hierarchical levels. The receipt of user input specifying data for multiple hierarchical levels is described below with reference to FIG. 3. Data of user profiles of the identified hierarchical levels are configured based on the user input.

3.1. Identifying Multiple Hierarchical Levels

Figure 2:
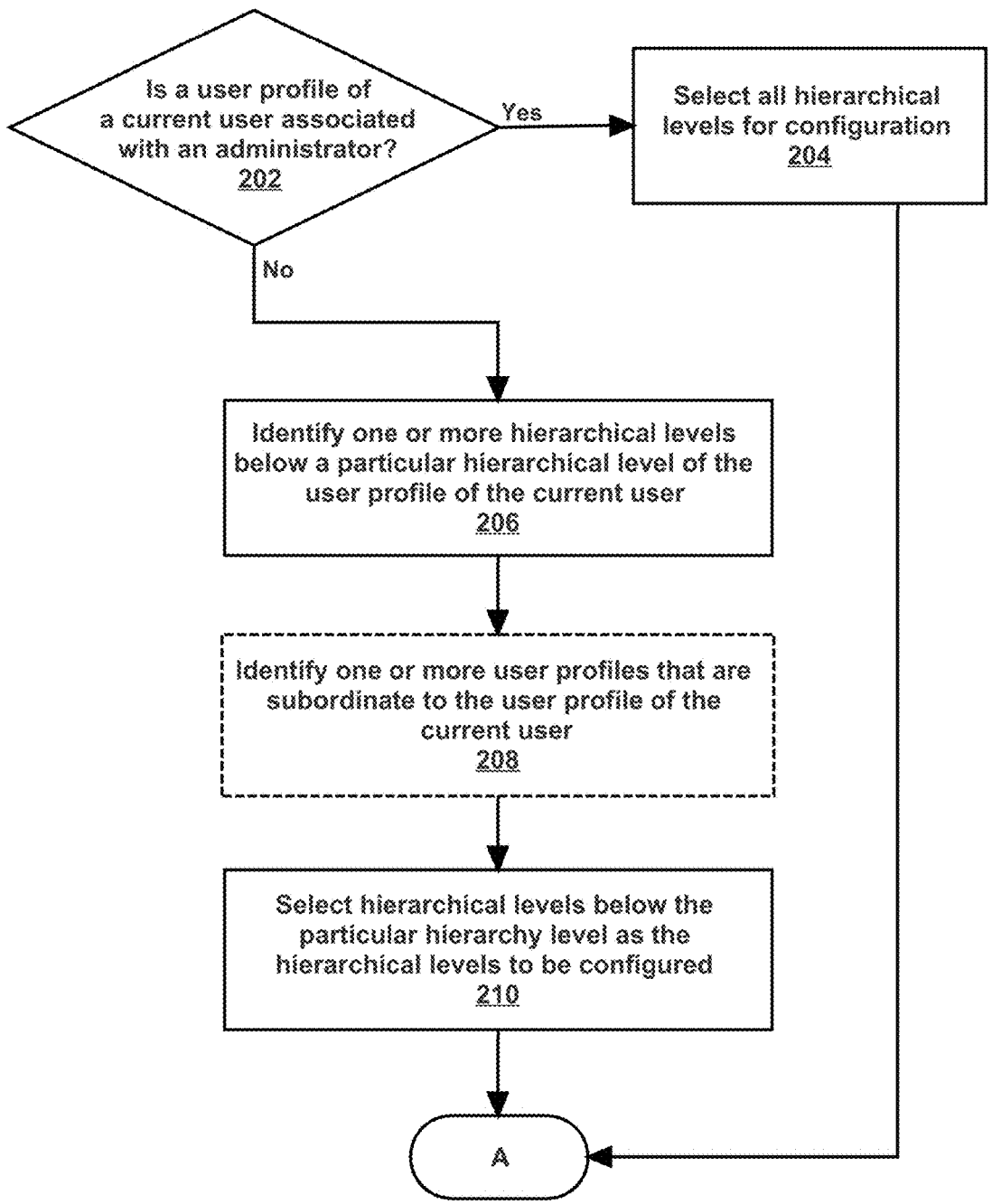
FIG. 2 illustrates an example set of operations for identifying multiple hierarchical levels to be configured in accordance with one or more embodiments.

FIG. 2 illustrates an example set of operations for identifying multiple hierarchical levels to be configured in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

Initially, a determination is made as to whether a user profile of a current user indicates that the current user is a system administrator, in accordance with one or more embodiments (Operation 202). A user profile of a current user (i.e., the user performing the configuration) may be identified in various ways. In an example, a set of available user profiles may be displayed on a Graphical User Interface (GUI). A particular user profile may be selected from the set of available user profiles using a checkbox. In another example, fields for entering a username and password may be displayed on a GUI. A particular user profile may be logged on based on the username and password received through the GUI.

In an example, user profiles are associated with various roles, one of which is system administrator. Each user profile is stored with its associated role in a database. After a user profile of a current user is identified, a lookup of the database is performed to determine the role associated with the user profile of the current user.

If the user profile indicates that the current user is a system administrator, then all hierarchical levels of an organization are selected for configuration (Operation 204). The system administrator would have overall management authority to configure data for all user profiles of all hierarchical levels. Configuration of data of user profiles associated with multiple hierarchical levels is described below with reference to FIG. 3.

If the user profile indicates that the current user is not a system administrator, then one or more hierarchical levels below a particular hierarchical level of a user profile of a current user are identified (Operation 206). A particular hierarchical level of a user profile of a current user may be identified in various ways. In an example, each user profile may store a number of a hierarchical level to which the corresponding employee belongs, for example, "Level 2." This information may be extracted from the user profile of the current user. In another example, user profiles may be associated with a tree structure that reflects an organizational hierarchy. Each level of the tree structure may reflect a hierarchical level. From the tree structure, a particular hierarchical level of the user profile may be identified.

In one or more embodiments, after the particular hierarchical level of the user profile of the current user is identified, hierarchical levels below the particular hierarchical level may be identified in various ways. In an example, hierarchical levels below the particular hierarchical level may be identified based on a numbering of the hierarchical levels. A particular hierarchical level of a user profile of a current user may be "Level 2." Then, hierarchical levels with a greater number than that of the particular hierarchical level may be identified, for example, "Level 3" and "Level 4." In another example, hierarchical levels below the particular hierarchical level of the user profile of the current user may be identified from a tree structure. Levels in the tree structure that are lower than the level of the user profile of the current user may be identified.

In an embodiment, one or more user profiles that are subordinate to the user profile of the current user are optionally identified (Operation 208). User profiles that are either directly or indirectly subordinate to the user profile of the current user may be identified using various ways. User profiles may be associated with a tree structure reflecting an organizational hierarchy.

From the tree structure, user profiles that extend from downward branches of a particular user profile may be identified. These user profiles are subordinates of the particular user profile. Alternatively, each user profile may store names of direct reports to the corresponding employee. Direct reports to a current user may be extracted from the user profile of the current user. Indirect reports may be determined based on the user profiles of direct reports and/or other indirect reports.

In an example, a user profile of a current user, Catherine, may indicate that "Donald" is a direct report to Catherine. The user profile of Donald may indicate that "Ethan" is a direct report to Donald. The user profile of Ethan may indicate that "Frank" is a direct report to Ethan. Donald, Ethan, and Frank may all be identified as subordinates to the current user Catherine.

In an embodiment, one or more hierarchical levels below the particular hierarchical level of the user profile of the current user are selected as the hierarchical levels to be configured (Operation 210). Data of user profiles of the selected hierarchical levels will be updated or modified based on values specified for these hierarchical levels via user input. Data of user profiles of hierarchical levels above the particular hierarchical level will not be affected. Configuration of data of user profiles associated with multiple hierarchical levels is described below with reference to FIG. 3.

In an embodiment, all or a subset of hierarchical levels below the particular hierarchical level of the user profile of the current user are selected for configuration. A hierarchical level below the particular hierarchical level is selected if the hierarchical level includes at least one subordinate to the current user. If all hierarchical levels are fully populated, then all hierarchical levels below the particular hierarchical level may be selected. If one or more hierarchical levels are not fully populated, then a subset of hierarchical levels below the particular hierarchical level may be selected. A particular hierarchical level is not fully populated if an employee corresponding to a hierarchical level above the particular hierarchical level is immediately superior to an employee corresponding to a hierarchical level below the particular hierarchical level.

In an example, a current user might be on Level 2. The current user might have subordinates in Level 4 but not subordinates in Level 3. Level 3 is not fully populated. Although Levels 3 and 4 are below Level 2, only Level 4 would be selected for configuration.

In an embodiment, user profiles are selected for configuration if the user profiles are (1) associated with hierarchical levels below the particular hierarchical level of the user profile of the current user and (2) subordinate to the user profile of the current user. If there are no other users on the particular hierarchical level of the current user, then all user profiles corresponding to hierarchical levels below the particular hierarchical level may be selected for configuration. If there are other users on the particular hierarchical level of the current user, then a subset of user profiles corresponding to hierarchical levels below the particular hierarchical level may be selected for configuration.

In an example, Catherine might be on Level 3, and there might be no other users on Level 3. Donald and David might report to Catherine. Donald and David might be siblings that are on Level 4. Ethan might report to Donald, and Elliot might report to David. Ethan and Elliot might be on Level 5. If the current user were Catherine, then the hierarchical levels below Catherine would include Levels 4 and 5. Levels 4 and 5 correspond to Donald, David, Ethan, and Elliot, all of whom are subordinate to Catherine. Thus, all user profiles corresponding to hierarchical levels below the particular hierarchy level of Catherine would be subordinate to Catherine and selected for configuration. Alternatively, if the current user were Donald, then the hierarchical levels below Donald would include Level 5. Level 5 corresponds to Ethan and Elliot. While Ethan is subordinate to Donald, Elliot is not. Thus, a subset of user profiles corresponding to hierarchical levels below Donald's hierarchy level would be considered subordinate to Donald. This subset would be selected for configuration.

Figure 3:
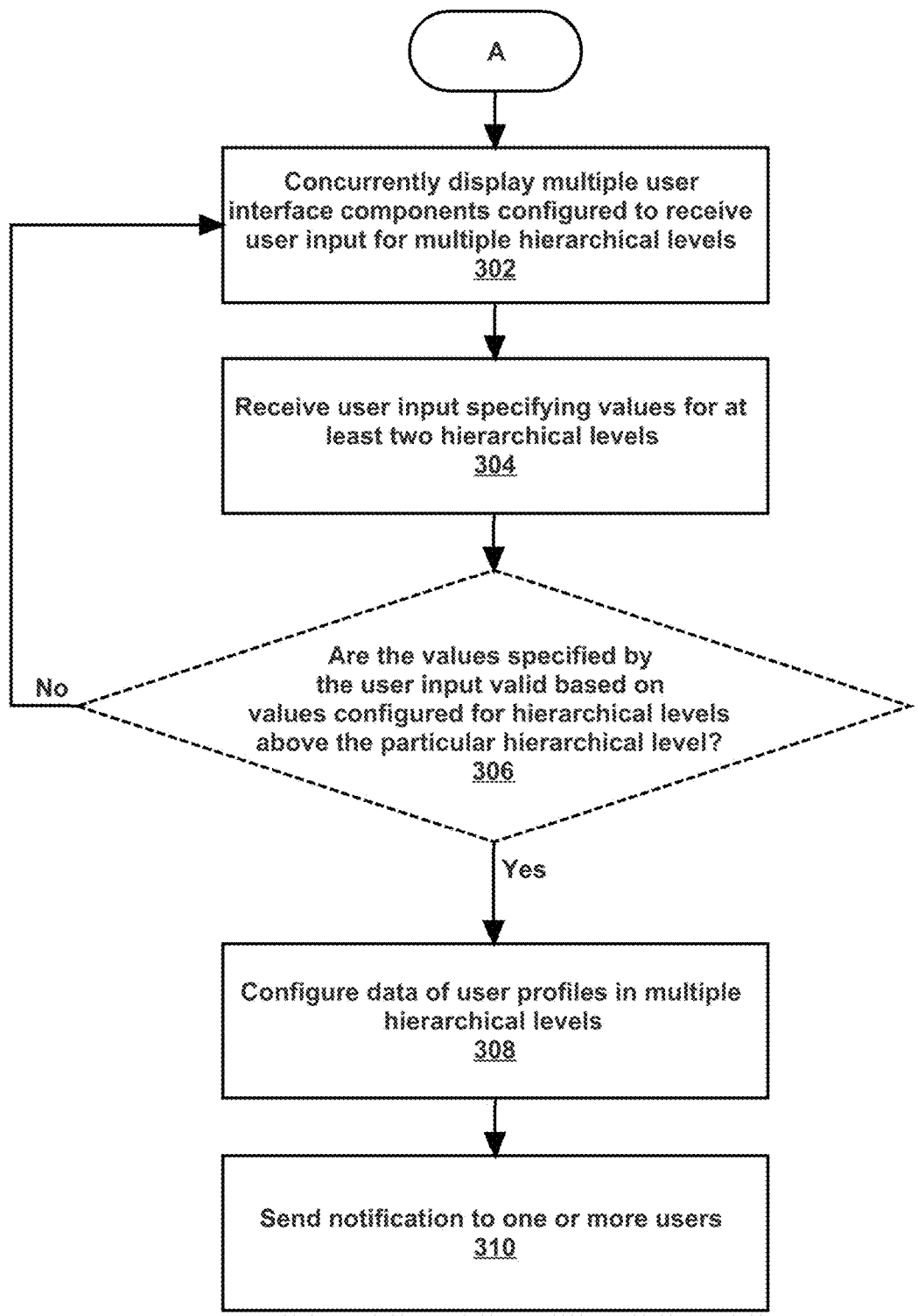
FIG. 3 illustrates an example set of operations for displaying multiple user interface components configured to receive user input specifying data for multiple hierarchical levels in accordance with one or more embodiments.

3.2. Concurrently Displaying Multiple User Interface Components for Receiving User Input Specifying Data for Multiple Hierarchical Levels FIG. 3 illustrates an example set of operations for displaying multiple user interface components configured to receive user input specifying data for multiple hierarchical levels in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

Initially, multiple user interface components configured to accept user input for multiple hierarchical levels are concurrently displayed (Operation 302). In an example, the multiple hierarchical levels being configured may be all hierarchical levels of an organization, as identified at Operation 204 of FIG. 2. In another example, the multiple hierarchical levels being configured may be one or more hierarchical levels below a particular hierarchical level of a user profile of a current user, as identified at Operation 210 of FIG. 2.

In an example, multiple user interface components may be displayed on a screen, monitor, touchscreen, or other device. Each user interface component may correspond to a different hierarchical level. A value entered at a user interface component may configure data for one or more user profiles associated with the corresponding hierarchical level.

In an example, user interface components may be configured to accept deadlines related to a compensation allocation plan. Each user interface component may accept a deadline for a different hierarchical level.

In an embodiment, user input specifying values for at least two hierarchical levels is received (Operation 304). User input is received using a keyboard, touchscreen, mouse, or other device. A same or different value may be specified for different hierarchical levels. Values for different hierarchical levels may be specified explicitly or implicitly by the user input.

In an embodiment, user input explicitly specifies values for at least two hierarchical levels. A first user input component accepts a first value. Data of a user profile corresponding to a first hierarchical level is to be configured to the first value. A second user input components accepts a second value. Data of a user profile corresponding to the second hierarchical level is to be configured to the second value. The first value and the second value are explicitly specified by user input.

In an embodiment, values for different hierarchical levels are inferred based on user input. A first user input component accepts a first value. Data of a user profile corresponding to a first hierarchical level is to be configured to the first value. A second user input component accepts a second value. The second value indicates a difference between data to be configured for user profiles of adjacent hierarchical levels. Data of a user profile corresponding to a hierarchical level, other than the first hierarchical level, is to be configured to a value that is determined based on the first value and the second value.

In an example, data of a user profile being configured may be a deadline for a compensation allocation plan. A current user may be on Level 2. A first user input component may correspond to Level 3, one level below that of the current user. User input may specify the date Jan. 15, 2015, in the first user input component. This would indicate that data of a user profile corresponding Level 3 is to be configured to Jan. 29, 2015.

A second user input component may accept a value setting a difference in time between deadlines to be configured for adjacent hierarchical levels. User input may specify two weeks in the second user input component. This would indicate that a deadline for a particular hierarchical level is to be two weeks before a deadline for a hierarchical level above the particular hierarchical level.

Data of a user profile corresponding to Level 4 is to be configured to two weeks before the deadline for Level 3, which is Jan. 15, 2015. Data of a user profile corresponding to Level 5 is to be configured to two weeks before the deadline for Level 4, which is Jan. 1, 2015. Thus, the value Jan. 1, 2015 for Level 5, and the value January 15 for Level 4, are implicitly specified by user input.

In an embodiment, a determination optionally is made as to whether the values specified by the user input are valid (Operation 306). Validity criteria, for determining whether a value for a particular hierarchical level is valid, depends on values configured for other hierarchical levels. In an example, deadlines for different hierarchical levels to complete a compensation allocation plan are being configured. A validity criterion may require that a deadline to be configured for a particular hierarchical level be on or before deadlines configured for hierarchical levels above the particular hierarchical level. A deadline for a hierarchical level of a senior associate may have been set to Jan. 29, 2015. User input may specify a deadline of Jan. 30, 2015 for a hierarchical level of a junior associate. The hierarchical level of the junior associate may be below the hierarchical level of the senior associate. Jan. 30, 2015 would be determined to be after the deadline already set for the hierarchical level of the senior associate. The value specified by the user input for the hierarchical level of the junior associate would be determined to be invalid.

In an embodiment, a range of acceptable values for a user input component corresponding to a particular hierarchical level is determined based on one or more validity criteria. Validity criteria may depend on values configured for other hierarchical levels as well as other factors, such as, today's date. In an example, a validity criterion may require that a deadline to be configured for a particular hierarchical level be on or before deadlines configured for hierarchical levels above the particular hierarchical level. A deadline for a hierarchical level of a senior associate might have been set to Jan. 29, 2015. Today's date might be Jan. 1, 2015. A user input component may be configured to accept a deadline for a hierarchical level of a junior associate, who reports to the senior associate. A range of acceptable values for the user input component may be determined to be January 1 to Jan. 29, 2015. If a value entered by user input into the user input component is not between January 1 and Jan. 29, 2015, then the value may be determined to be invalid.

In an embodiment, validity criteria depend on values configured for a particular hierarchical level of a user profile of a current user. In an example, a validity criterion may require that a deadline to be configured for a particular hierarchical level be on or before deadlines configured for hierarchical levels above the particular hierarchical level. A deadline for the particular hierarchical level of a current user has been set to Jan. 15, 2015. User input specifies a deadline of Jan. 16, 2015, for a hierarchical level below the particular hierarchical level. The value specified by the user input is determined to be invalid.

If at least one of the values specified by the user input is not valid, then user input components configured to accept user input specifying values for multiple hierarchical levels are concurrently displayed (Operation 302). User input specifying values for one or more hierarchical levels may be re-entered.

If the values specified by the user input are valid, then data of user profiles in multiple hierarchical levels are configured based on the values (Operation 308). Data of user profiles in multiple hierarchical levels may be configured directly or indirectly based on values specified by the user input. In an example, user input may specify a first value for a first hierarchical level and a second value for a second hierarchical level. Then data of a first user profile associated with the first hierarchical level would be configured directly based on the first value, and data of a second user profile associated with the second hierarchical level would be configured directly based on the second value.

In another example, user input may specify a first value for a first hierarchical level. User input may also specify a difference between values to be configured for adjacent hierarchical levels. A value for a first hierarchical level minus the difference equals a value to be configured for a second hierarchical level, wherein the first hierarchical level is immediately below the second hierarchical level. Then data of a first user profile associated with the first hierarchical level would be configured based on the first value. Data of a second user profile associated with a second hierarchical level would be configured based on the first value and the difference. In an example, user input may specify Jan. 15, 2015 for "Level 2," and a difference of two weeks for values between adjacent hierarchical levels. A value for Level 3 may be determined to be Jan. 15, 2015 minus two weeks, which is Jan. 1, 2015. Data of a user profile in Level 3 may be configured to have the value, Jan. 1, 2015.

In an embodiment, all or a subset of user profiles associated with a particular hierarchical level are configured based on a value specified by user input for the particular hierarchical level. In an example, user profiles that are not subordinate to a user profile of a current user are not configured by any user input entered by the current user. If there are no other users on the particular hierarchical level of the current user, then all user profiles corresponding to a hierarchical level may be configured based on user input entered by the current user for the hierarchical level. If there are other users on the particular hierarchical level of the current user, then a subset of user profiles corresponding to a hierarchical level may be configured based on user input entered by the current user for the hierarchical level.

In an example, Catherine may be on Level 3, and there may be no other users on Level 3. Donald and David may report to Catherine. Donald and David may be siblings that are on Level 4. Ethan may report to Donald, and Elliot may report to David. Ethan and Elliot may be on Level 5. If the current user is Catherine, all user profiles on hierarchical levels below Catherine's would be subordinate to Catherine. When Catherine specifies a value for Level 4, then all user profiles on Level 4, Donald's and David's, would be configured. Alternatively, if the current user is Donald, then a subset of user profiles on hierarchical levels below Donald's would be subordinate to Donald. When Donald specifies a value for Level 5, then Ethan's user profile would be configured, but Elliot's would not be.

In an embodiment, a notification is sent to one or more users (Operation 310). Different types of notifications may depend on different notification triggers. In an example, a notification informs a current user that data of a user profile of the current user has been modified or updated. This type of notification is triggered whenever a user profile is modified or updated based on user input. The notification is displayed to a current user when a user profile is being accessed or used by the current user.

In an embodiment, a notification informs a current user that data of a user profile of the current user is within a particular range. In an example, data of a user profile being configured may be a deadline for a compensation allocation plan. A notification may inform a current user that the deadline is approaching, for example, the deadline is within fifteen days, or the deadline is within three days. This type of notification is triggered when the deadline is within a particular time period from the current date.

In an embodiment, a notification informs a current user that data of a user profile of the current user, or of a user profile of a subordinate of the current user, is no longer valid. In an example, data of a user profile being configured may be a deadline for a compensation allocation plan. A validity criterion may require that a deadline to be configured for a particular hierarchical level be on or before deadlines configured for hierarchical levels above the particular hierarchical level. This type of notification is triggered when a deadline for an upper hierarchical level is advanced to a date that is earlier than a deadline already set for a lower hierarchical level.

In an example, a current user may be on Level 2. A deadline for Level 1 may be originally set to Feb. 1, 2015. A deadline for Level 2 may be originally set to Jan. 29, 2015. A deadline for Level 3 may be originally set to Jan. 15, 2015. A system administrator may modify the deadline for Level 1 to Jan. 14, 2015, which is before the original deadlines for Level 2 and Level 3. The original deadlines for Level 2 and Level 3 would no longer be valid. A notification may be sent to inform the current user that the original deadlines for Level 2 and Level 3 are no longer valid. The notification may also include a range of acceptable dates for Level 2 and Level 3. The notification may state, for example, that the range of acceptable dates for Level 2 and Level 3 is any date on or before Jan. 14, 2015.

In an embodiment, notifications are sent substantially simultaneously to multiple users. The notifications may be sent through a batch processing. The batch processing places the transmission of notifications into a background process of an application, which may or may not be visible to a user.

The batch processing also places the transmission of notifications at a lower priority than other processes executed by the application.

4. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 4A-4E illustrate an example set of user interfaces for configuring user profiles associated with multiple hierarchies in accordance with one or more embodiments. In this example, deadlines for completing a compensation allocation plan by multiple hierarchy levels is being configured.

Figure 4A:
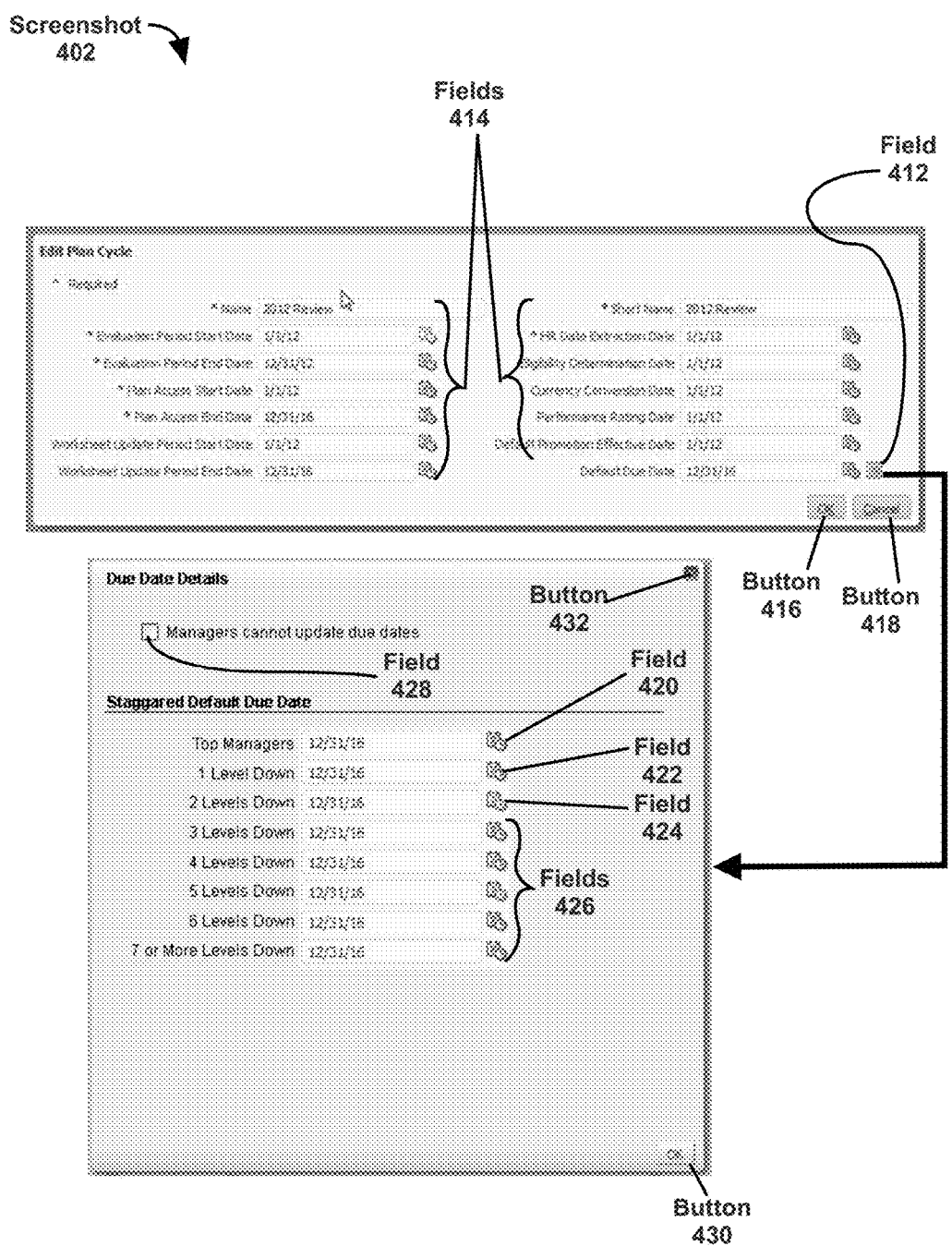
FIGS. 4A-4E illustrate an example set of user interfaces for configuring user profiles associated with multiple hierarchies in accordance with one or more embodiments.

As illustrated in FIG. 4A, screenshot 402 allows a system administrator to edit details of a compensation allocation plan, including due dates for each hierarchy level. Field 412 accepts a due date for the compensation allocation plan. Fields 414 accepts other details, such as a name of the compensation allocation plan, an evaluation period start date and end date, and a plan access start date and end date. Fields 414 also includes a date on which human resources data is extracted from a database. The database stores the hierarchical levels of the organization as well as user profiles associated with each hierarchical level. Fields 412-414 may accept a date typed into the text box, or a date selected from a date selector.

Field 412 may accept a default due date, which applies to all hierarchical levels. Alternatively, field 412 may be selected to open a new window displaying multiple user interface components configured to receive user input for multiple hierarchical levels. Field 420 corresponds to top managers, field 422 corresponds to employees who are one level down ("1 Level Down") from the top managers, and field 424 corresponds to employees who are two levels down ("2 Levels Down") from the top managers. Similarly, fields 426 correspond to employees of successive lower levels.

Field 428 accepts user input specifying whether managers can update due dates. If field 428 is checked, then a manager may modify the due date for employees who are subordinate to the manager. For example, a manager corresponding to the "1 Level Down" level may modify the due date for an employee in the "3 Levels Down" level who is subordinate to the manager. However, the manager may not modify the due date for an employee in the "3 Levels Down" level who is not subordinate to the manager.

After fields 420-426 are set, button 430 is selected to submit the user input in fields 420-426. Upon submission, verification to ensure that fields 420-426 are set to valid values is performed. A validity criterion requires that a due date of a lower level be on or before a due date of a higher level. Thus, a value entered into the "2 Levels Down" level must be on or before a value entered into the "1 Level Down" level and a value entered into the "Top Managers" level in order to be valid. If one of the values are not valid, the window with fields 420-426 remains open, so that new values may be re-entered into fields 420-426. If all of the values entered into fields 420-426 are valid, then the values are submitted. Alternatively, button 432 is selected to cancel the entry of due dates.

Button 418 is selected to submit the user input in field 412 (which includes the user input in fields 420-426) and fields 414. Based on extracted human resources data identifying the hierarchical levels and associated user profiles, data of user profiles is configured based on hierarchical levels. Data of user profiles associated with the "Top Managers" level are configured with the value entered into field 420. Data of user profiles associated with the "1 Level Down" level are configured with the value entered into field 422. Data of user profiles associated with the "2 Levels Down" level are configured with the value entered into field 424. Data of user profiles associated with successive lower levels are configured with the values entered into fields 426, respectively. Alternatively, button 416 is selected to cancel the entry of details for a compensation allocation plan.

Figure 4B:
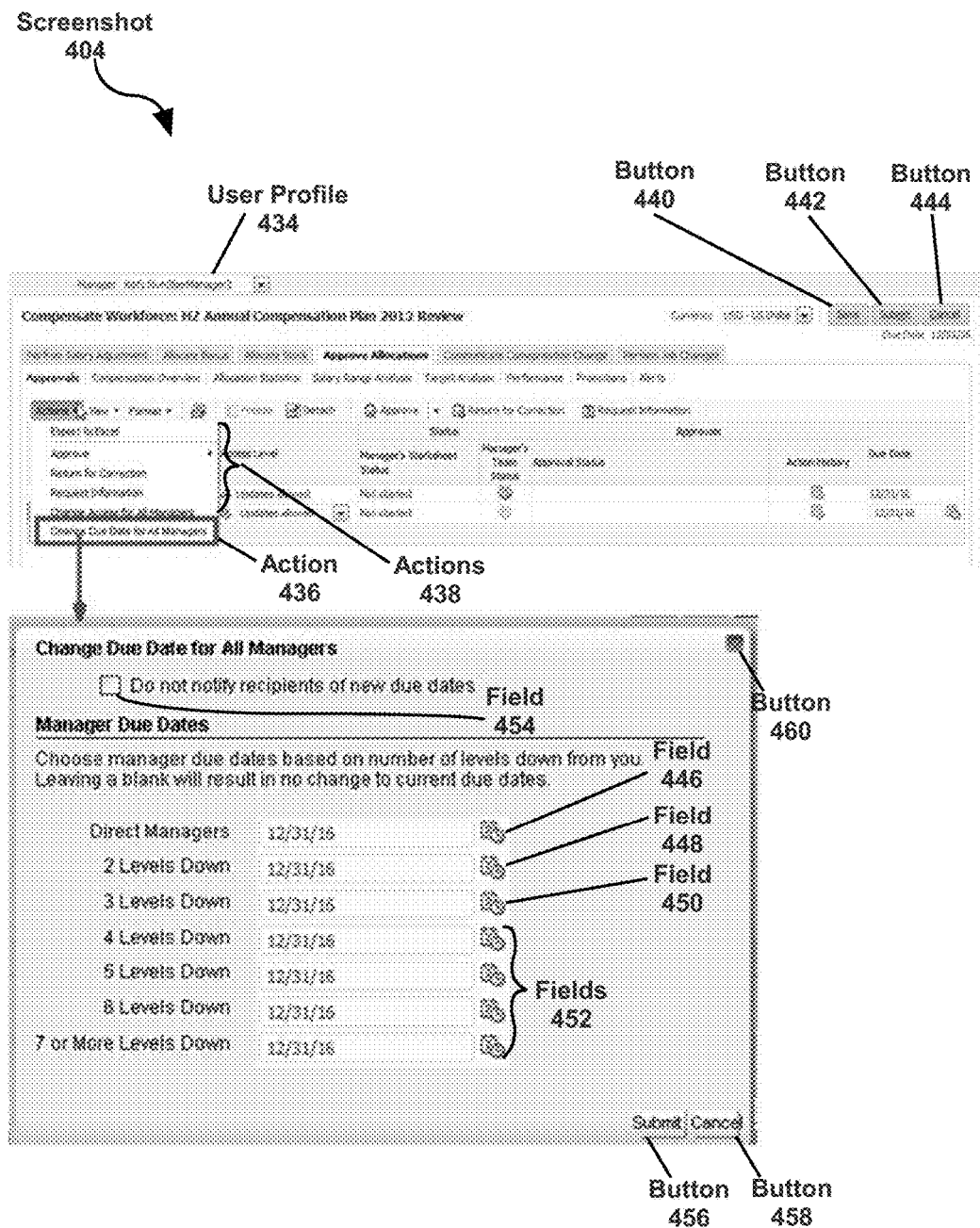

As illustrated in FIG. 4B, screenshot 404 allows a current user to edit due dates for completing a compensation allocation plan for hierarchy levels below a particular hierarchy level of a user profile of the current user. The current user may be in any of the hierarchy levels of the organization. User profile 434 displays a name of the current user whose user profile is currently being used. Action 436 is selected to change due dates for employees subordinate to the current user. Actions 438 are selected to perform other actions, such as approve the work of subordinates, return the work of subordinates for correction, or request additional information from subordinates. Action 436 is made available for selection if field 428 is checked from screenshot 402.

When action 436 is selected, a new window displaying multiple user interface components configured to receive user input for multiple hierarchical levels is opened. The multiple hierarchy levels are labeled or numbered with respect to the particular hierarchical level of the current user. Field 446 corresponds to employees who are direct reports of the current user. Field 448 corresponds to employees who are two levels down ("2 Levels Down") from the current user. Field 450 corresponds to employees who are three levels down ("3 Levels Down") from the current user. Similarly, fields 452 correspond to employees of successive lower levels with respect to the current user. Each of the levels corresponding to fields 446-452 is associated with employees who are subordinate to the current user.

In an example, a current user is associated with "Level 3" of an organization, which is two levels down from the top managers of the organization. Fields 446-452 do not correspond to any levels above "Level 3." Field 446 corresponds to a level below the current user, which is "Level 4" of the organization. Field 448 corresponds to two levels below the current user, which is "Level 5" of the organization.

Fields 446-452 are associated with subordinates of the current user. In an example, "Level 4" is associated with a first set of subordinates of the current user and a second set of subordinates of a sibling of the current user. Field 446 corresponding to "Level 4" is configured to modify data of user profiles of the first set of subordinates, but not the second set of subordinates.

In an example (not shown), a window displays multiple user interface components configured to receive user input for multiple hierarchical levels, wherein at least one hierarchical level is skipped. The hierarchical level that is skipped is a hierarchical level that is (1) below the current user's hierarchical level, and (2) not populated with at least one subordinate of the current user. For example, a current user is in "Level 3" of an organization. If "Level 5" does not include any subordinates of the current user, then a user input component corresponding to two levels down ("2 Levels Down") would not be displayed. User input components corresponding to one level down ("1 Level Down") and three levels down ("3 Levels Down") would be displayed but a user input component corresponding to two levels down ("2 Levels Down") would be skipped.

When the window displaying multiple user interface components is opened, due dates that were previously configured for each of the hierarchical levels is initially displayed in fields 446-452. The due dates may be overwritten by user input specifying new due dates for each of the hierarchical levels.

Field 454 accepts user input specifying whether a notification is to be sent to notify recipients of new due dates. If checked, a notification is sent to each of the user profiles whose data is modified. If not checked, then no notification is sent.

After fields 446-452 are set, button 456 is selected to submit the user input. Upon submission, verification to ensure that fields 446-452 are set to valid values is performed. If one of the values are not valid, the window with fields 446-452 remains open, so that new values may be re-entered into fields 446-452. If all of the values entered into fields 446-452 are valid, then the values are submitted. Alternatively, button 458 or button 460 is selected to cancel the entry of due dates.

Button 442 is selected to submit the user input entered for action 436 (which includes the user input in fields 446-452) and actions 438. Data of user profiles associated with the "Direct Managers" level are configured with the value entered into field 446. Data of user profiles associated with "2 Levels Down" with respect to the current user are configured with the value entered into field 448. Data of user profiles associated with "3 Levels Down" with respect to the current user are configured with the value entered into field 450. Data of user profiles associated with successive lower levels are configured with the values entered into fields 452, respectively. Alternatively, button 440 is selected to save the user input without configuring any user profiles. Alternatively, button 444 is selected to cancel the entry of user input for action 436 and actions 438.

Figure 4C:
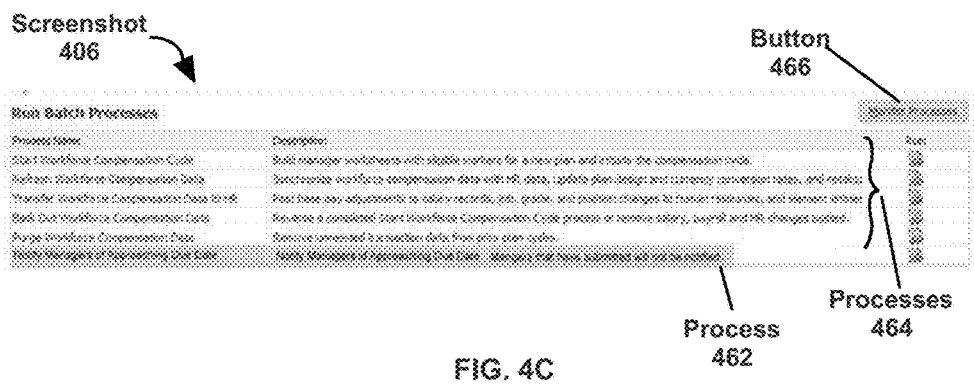

As illustrated in FIG. 4C, screenshot 406 allows a user to run batch processes. Process 462 is a process for notifying managers of an approaching due date. Managers that have already made a submission, and thus have already met the due date, are not notified. Processes 464 include a process for building manager worksheets with eligible workers for a new plan and initiating the compensation cycle, synchronizing workforce compensation data with human resources data, posting base pay adjustments to salary records or position changes to human resources, and reversing another batch process. Button 466 is selected to monitor processes 462 and 464. After selecting button 466, a progress bar shows a percentage completion of a batch process.

Figure 4D:
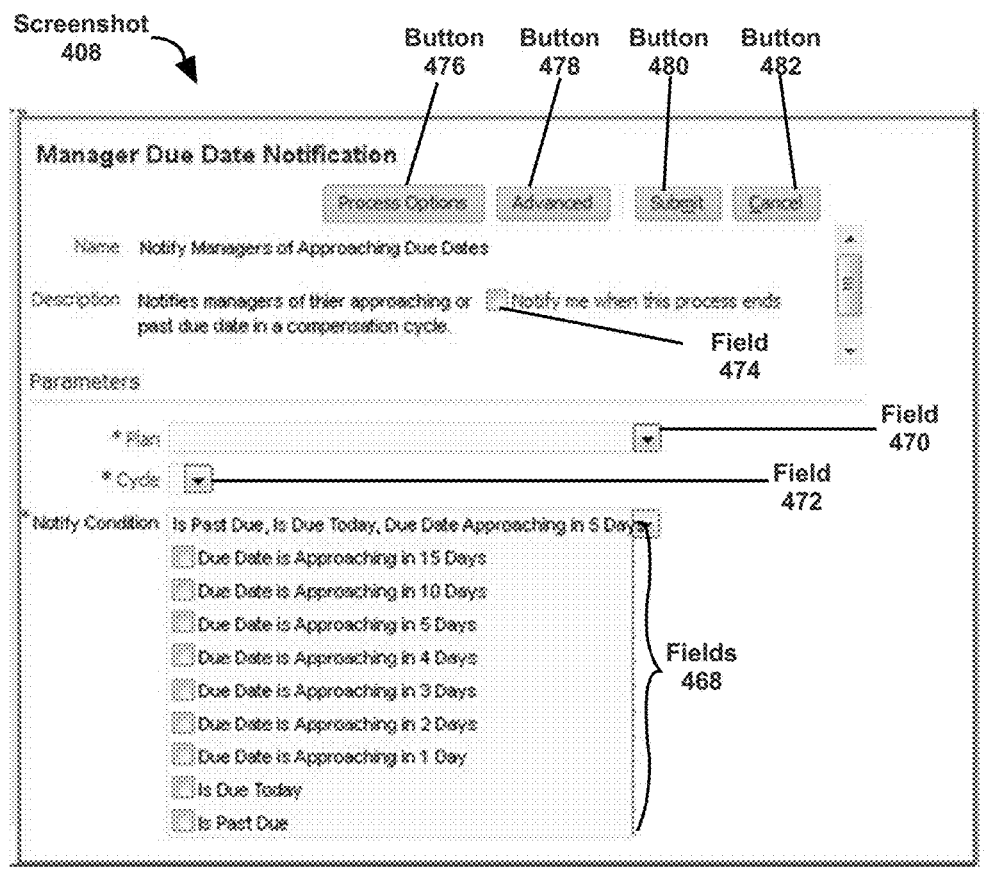

As illustrated in FIG. 4D, screenshot 408 allows a user to configure notifications of approaching due dates. Fields 468 is a dropdown menu for specifying a notification condition, that is, the time period before (or after) a due date at which the notification should be sent. For example, a notification may be sent fifteen days before the due date, on the due date itself, or a day after the due date. Fields 470 and 472 accept user input specifying the compensation allocation plan and cycle relevant to the notification. Field 474 accepts user input specifying whether to notify the user when the notification process is complete. Button 476 is selected to configure other options for the notification process. Button 478 is selected to configure advanced options. Button 480 is selected to submit the notification process. Button 482 is selected to cancel the notification process.

Figure 4E:
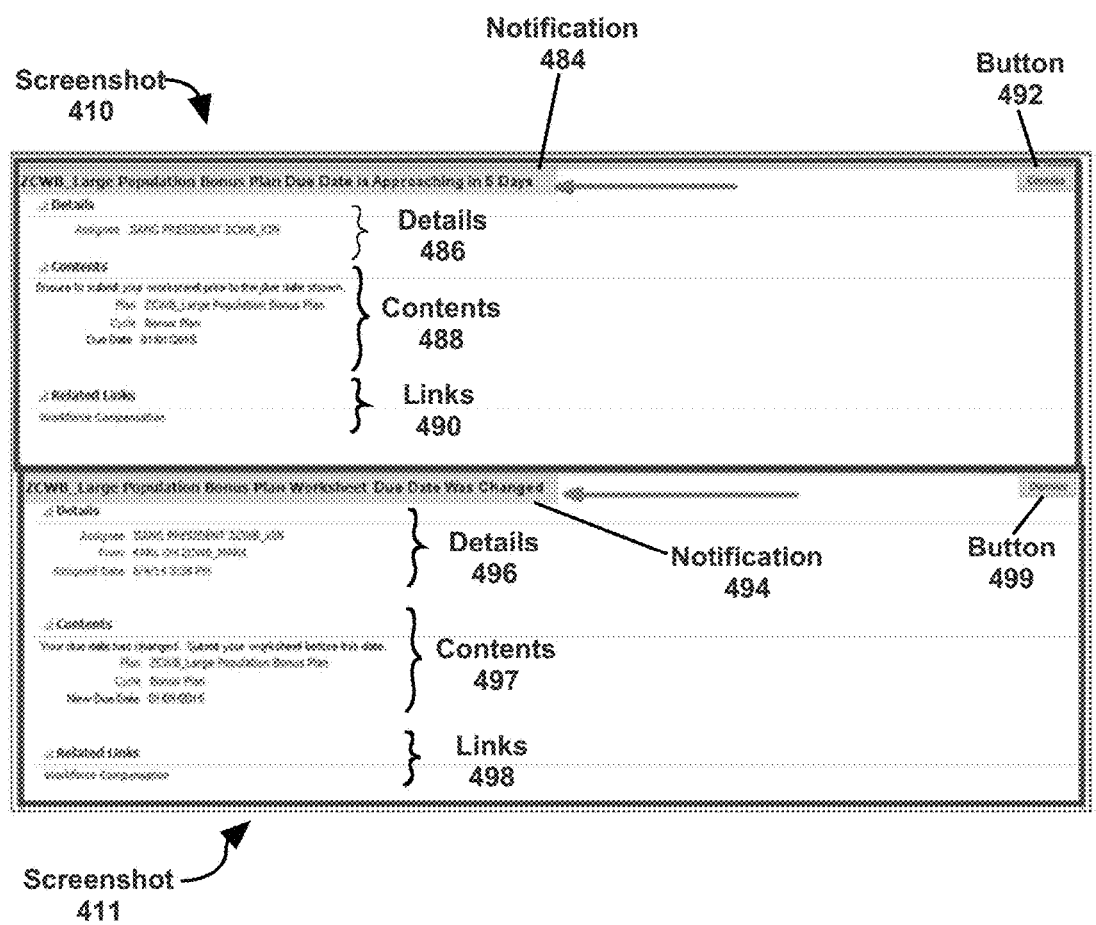

As illustrated in FIG. 4E, screenshots 410 and 411 displays two types of notifications. Screenshots 410 and 411 is displayed when a user profile is being accessed or used.

Screenshot 410 displays a notification 484 notifying a user of an approaching due date. The notification includes the name of the compensation allocation plan that is due. For example, "ZCWB_Large Population Bonus Plan Due Date is Approaching in 5 Days." Details 486 include the assignee of the due date. Contents 488 include the specifics of what is due, such as, the submission of a compensation worksheet Links 490 include related links, such as, a link to the compensation worksheet. Button 492 is selected to dismiss the notification.

Screenshot 411 displays a notification 494 notifying a user of a changed due date. The due date may be changed by a system administrator or by a superior to the current user. The notification includes the name of the compensation allocation plan that is due. Details 496 includes the assignee of the due date, and the user who made the change to the due date. Details 496 also includes the date on which the due date was changed. Contents 497 includes the specifics of the change, such as, the name and cycle of the compensation allocation plan that is changed and the new due date Links 498 includes related links, such as, a link to the compensation worksheet. Button 499 is selected to dismiss the notification.

5. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
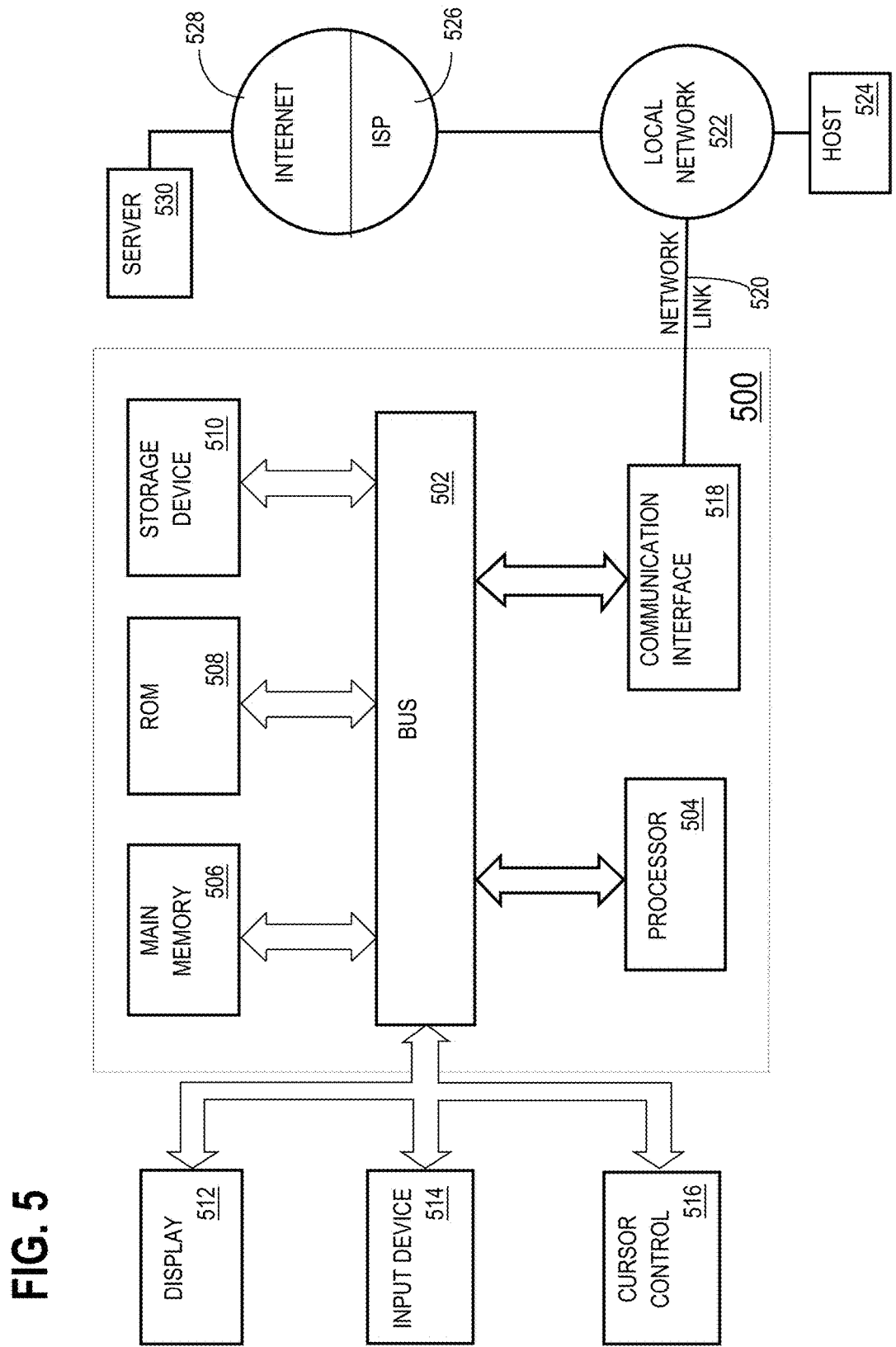
FIG. 5 illustrates a system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    identifying a plurality of hierarchical levels, corresponding to an organizational hierarchy, each hierarchical level being associated with a respective set of one or more user profiles;
    concurrently displaying a plurality of interface components corresponding respectively to the plurality of hierarchical levels, each interface component configured to receive user input specifying a data value for configuring data of at least one user profile associated with each respective hierarchical level of the plurality of hierarchical levels, the plurality of interface components comprising at least a first interface component corresponding to a first hierarchical level and a second interface component corresponding to a second hierarchical level;
    receiving user input specifying at least a first value via the first interface component corresponding to the first hierarchical level;
    receiving user input specifying at least a second value via the second interface component corresponding to the second hierarchical level;
    determining whether the second value received via the second interface component corresponding to the second hierarchical level is valid based at least on the first value received via the first interface component corresponding to the first hierarchical level;
    responsive to determining that the second value received via the second interface component corresponding to the second hierarchical level is valid:
        configuring data of a first user profile associated with the first hierarchical level based on the first value; and
        configuring data of a second user profile associated with the second hierarchical level based on the second value.

2. The medium of claim 1, wherein the operations further comprise:
    prior to identifying the plurality of hierarchical levels:
        identifying a particular hierarchical level associated with a third user profile of a current user; and
        selecting one or more hierarchical levels below the particular hierarchical level as the plurality of hierarchical levels;
    wherein the user input is received from the third user profile of the current user.

3. The medium of claim 1, wherein the plurality of hierarchical levels does not include at least one hierarchical level that is above a particular hierarchical level associated with a third user profile of a current user, and wherein the user input is received from the third user profile of the current user.

4. The medium of claim 1, wherein the first user profile and the second user profile are subordinate to a third user profile of a current user, within the organizational hierarchy, and wherein the user input is received from the third user profile of the current user.

5. The medium of claim 1, wherein the respective set of one or more user profiles associated with each hierarchical level of the plurality of hierarchical levels excludes all user profiles that are not subordinate to a third user profile of a current user, within the organizational hierarchy, and wherein the user input is received from the third user profile of the current user.

6. The medium of claim 1, wherein the operations further comprise configuring data of a set of user profiles associated with the first hierarchical level that are subordinate to a third user profile of a current user, within the organizational hierarchy, based on the first value, and wherein the user input is received from the third user profile of the current user.

7. The medium of claim 6, wherein the operations further comprise sending a notification to each user profile of the set of user profiles associated with the first hierarchical level that is subordinate to the third user profile of the current user, within the organizational hierarchy.

8. The medium of claim 1, wherein the operations further comprise:
    responsive to configuring the data of the first user profile, sending a notification to the first user profile.

9. The medium of claim 1, wherein the concurrently displaying operation comprises displaying the plurality of interface components without displaying any interface component corresponding to a hierarchical level above a particular hierarchical level of a third user profile of a current user, and wherein the user input is received from the third user profile of the current user.

10. The medium of claim 1, wherein the operations further comprise determining a range of acceptable values for the second interface component based on a value configured for a third user profile of a current user, and wherein the user input is received from the third user profile of the current user.

11. The medium of claim 1, wherein the operations further comprise:
    based on the second value received via the second interface component corresponding to the second hierarchical level:
        determining a set of one or more values for one or more user profiles associated with a third hierarchical level, the one or more user profiles associated with the third hierarchical level being subordinate to one or more user profiles associated with the second hierarchical level, within the organizational hierarchy; and
        configuring data of the one or more user profiles associated with the third hierarchical level based on the set of one or more values.

12. The medium of claim 1, wherein the operations further comprise determining a range of acceptable values for a particular hierarchical level based on a value configured for a hierarchical level above the particular hierarchical level.

13. The medium of claim 1, wherein the operations further comprise:
    prior to configuring the data of the first user profile associated with the first hierarchical level:
        determining that the first value is valid based on at least a value configured for a user profile associated with a hierarchical level above the first hierarchical level.

14. The medium of claim 1, wherein the operations further comprise:

prior to configuring the data of the first user profile:
determining that the first value is valid based on at least a value configured for a user profile superior to the first user profile, within the organizational hierarchy.

15. The medium of claim 1, wherein the first value comprises a first deadline for the first hierarchical level and wherein the second value comprises a second deadline for the second hierarchical level.

16. The medium of claim 15, wherein the operations further comprise sending a notification to the first user profile within a particular time period before the first deadline.

17. The medium of claim 1, wherein the first value comprises a first deadline for completing a compensation allocation plan by the first hierarchical level and wherein the second value comprises a second deadline for completing the compensation allocation plan by the second hierarchical level.

18. The medium of claim 1, wherein the operations further comprise:
receiving user input specifying a difference in values to be configured for data of user profiles associated with adjacent hierarchical levels.

19. A method, comprising:
identifying a plurality of hierarchical levels, corresponding to an organization hierarchy, each hierarchical level being associated with a respective set of one or more user profiles;
concurrently displaying a plurality of interface components corresponding respectively to the plurality of hierarchical levels, each interface component configured to receive user input specifying a data value for configuring data of at least one user profile associated with each respective hierarchical level of the plurality of hierarchical levels, the plurality of interface components comprising at least a first user interface component corresponding to a first hierarchical level and a second interface component corresponding to a second hierarchical level;
receiving user input specifying at least a first value via the first interface component corresponding to the first hierarchical level;
receiving user input specifying at least a second value via the second interface component corresponding to the second hierarchical level;
determining whether the second value received via the second interface component corresponding to the second hierarchical level is valid based at least on the first value received via the first interface component corresponding to the first hierarchical level;
responsive to determining that the second value received via the second interface component corresponding to the second hierarchical level is valid:
configuring data of a first user profile associated with the first hierarchical level based on the first value; and
configuring data of a second user profile associated with the second hierarchical level based on the second value.

20. A system, comprising:
at least one device including a hardware processor;
the system being configured to perform operations comprising:
identifying a plurality of hierarchical levels, corresponding to an organizational hierarchy, each hierarchical level being associated with a respective set of one or more user profiles;
concurrently displaying a plurality of interface components corresponding respectively to the plurality of hierarchical levels, each interface component configured to receive user input specifying a data value for configuring data of at least one user profile associated with each respective hierarchical level of the plurality of hierarchical levels, the plurality of interface components comprising at least a first user interface component corresponding to a first hierarchical level and a second interface component corresponding to a second hierarchical level;
receiving user input specifying at least a first value via the first interface component corresponding to the first hierarchical level;
receiving user input specifying at least a second value via the second interface component corresponding to the second hierarchical level;
determining whether the second value received via the second interface component corresponding to the second hierarchical level is valid based at least on the first value received via the first interface component corresponding to the first hierarchical level;
responsive to determining that the second value received via the second interface component corresponding to the second hierarchical level is valid:
configuring data of a first user profile associated with the first hierarchical level based on the first value; and
configuring data of a second user profile associated with the second hierarchical level based on the second value.

* * * * *

UNITED STATES PATENT AND TRADEMARK OFFICE
CERTIFICATE OF CORRECTION

PATENT NO. : 10,168,883 B2  
APPLICATION NO. : 14/801352  
DATED : January 1, 2019  
INVENTOR(S) : Upadhyaya Page 1 of 1

It is certified that error appears in the above-identified patent and that said Letters Patent is hereby corrected as shown below:

In the Specification

In Column 16, Line 7, delete "worksheet" and insert -- worksheet. --, therefor.

Signed and Sealed this  
Thirty-first Day of December, 2019

Andrei Iancu  
*Director of the United States Patent and Trademark Office*